United States Patent [19]
Boldt et al.

[11] Patent Number: 5,664,142
[45] Date of Patent: Sep. 2, 1997

[54] CHAINED DMA DEVICES FOR CROSSING COMMON BUSES

[75] Inventors: Gerald Donald Boldt, Longmont, Colo.; Stephen Dale Hanna, Tucson, Ariz.; Robert Eric Vogelsberg, Boulder, Colo.

[73] Assignee: International Business Machines Corporation, Armonk, N.Y.

[21] Appl. No.: 591,355

[22] Filed: Oct. 1, 1990

[51] Int. Cl.⁶ ................................. G06F 13/36
[52] U.S. Cl. .................. 711/112; 364/DIG. 1; 711/163; 395/842
[58] Field of Search ................ 364/200, 900; 395/400, 425

[56] References Cited

U.S. PATENT DOCUMENTS

| | | | |
|---|---|---|---|
| 4,354,225 | 10/1982 | Frieder et al. | 395/275 |
| 4,400,775 | 8/1983 | Nozaki et al. | 364/200 |
| 4,428,044 | 1/1984 | Liron | 395/275 |
| 4,490,788 | 12/1984 | Rasmussen | 395/425 |
| 4,495,567 | 1/1985 | Treen | 364/200 |
| 4,527,237 | 7/1985 | Frieder et al. | 364/200 |
| 4,682,285 | 7/1987 | Ozil et al. | 364/200 |
| 4,773,000 | 9/1988 | Nissen | 364/200 |
| 4,837,677 | 6/1989 | Burrus, Jr. et al. | 364/200 |
| 4,878,166 | 10/1989 | Johnson et al. | 364/200 |
| 5,056,011 | 10/1991 | Yoshitake et al. | 395/425 |

OTHER PUBLICATIONS

Article titled "High–Speed Multi–Master Channel Interface", IBM Technical Disclosure Bulletin, vol. 30, No. 11, Apr. 1988, pp. 317–319.

Article titled "Direct Memory Access Controller (DMAC)", Microprocessor, Microcontroller and Peripheral Data, vol. 11, DL139, 1988.

Primary Examiner—Reba I. Elmore
Attorney, Agent, or Firm—Carl M. Wright

[57] ABSTRACT

Chaining or cascading two or more DMA devices to perform DMA transfers across common buses. DMA devices are modified to act as a bus slave relative to another DMA bus master device so that information can be transferred from one bus to another across a third bus common to the DMA devices. The slave DMA can cause the master DMA to stop sending data to limit the bandwidth requirements of the common bus.

6 Claims, 4 Drawing Sheets

CHAINED DMA DEVICES FOR CROSSING COMMON BUSES

DOCUMENTS INCORPORATED BY REFERENCE

Co-pending patent applications Ser. No. 07/473,014, filed Jan. 31, 1990 ASYNCHRONOUS DAISY CHAIN ARBITER WITH FALSE SIGNAL LOCKOUT and 07/590,118 filed Sep. 28, 1990 FAST ASYNCHRONOUS RESOURCE MASTER-SLAVE COMBINATION are incorporated herein by reference to illustrate the operation sequences of bus masters and bus slave devices for transferring data among elements of an information processing system.

BACKGROUND AND SUMMARY OF THE INVENTION

This invention relates to data transfers between buses using DMA (Direct Memory Access) devices and particularly to the use of modified DMA devices to transfer data across a common bus between two DMA devices.

Direct Memory Access is a data transfer technique for moving data between two devices, commonly a memory and a peripheral device without the intervention of a system processor. Early computer systems had external devices for supplying or receiving data to and from the system memory where all the devices were controlled by the processor. DMA provided a way to access the memory without using processor resources. The DMA would steal a cycle, i.e., interrupt the processor which was held off for a cycle, to perform the memory function. In some cases, the processor would not access the memory for a cycle, e.g., during a register-to-register operation. The DMA could, in response to a processor signal that a nonmemory function was being executed, use the memory during that cycle to read or to write data.

Early DMA operations were performed by the peripheral device but improvements resulted in separate DMA devices that were coupled between a local bus and an external bus. The local bus typically coupled the processor and its memory. The external bus coupled at least one peripheral data device to the DMA device, but the usual case was that several peripheral data devices were coupled to the external bus.

The data devices on the external bus could thereby operate independently from the system processor. In fact, the data device could be another processor with its own memory and local bus. Another such data device might be a printer that needed an occasional transfer of data specifying the print information.

The data devices on the external bus would be coupled to the DMA device which would control both the external and the local bus to transfer data from a data device to the memory or vice versa.

As systems increased in size and complexity, more than one external bus was provided. Another DMA device would be used to couple the second external bus to the local bus.

To transfer data between the external buses, e.g., from a data device on one external bus to a data device on the other external bus, the data is moved from the first external bus into the memory on the local bus by the first DMA device and then moved from the memory to the second external bus by the second DMA device.

Such systems are described in the prior art.

U.S. Pat. No. 4,682,285 shows a unit for coupling a plurality of processing systems with one or more peripheral units using an exchange bus within each processing systems that can be coupled to a local bus through suitable bus controllers. There is no disclosure or suggestion of the ability of the bus controllers to couple the individual exchange buses of the processing systems together via the local bus.

U.S. Pat. No. 4,400,775 discloses local and global memories shared by several arithmetic-control units and the access control.

U.S. Pat. No. 4,773,000 describes a DMA system for reducing processor interrupts by using a dedicated portion of the main memory as a random access buffer, limiting the accessible memory of each DMA device.

U.S. Pat. No. 4,878,166 describes a RISC processor system interconnecting a set of high performance devices on a local bus to a set of low performance devices on a remote bus. The DMA interface between the local and the remote bus facilitates transfers between devices having differing performance characteristics.

U.S. Pat. No. 4,837,677 discloses a bus interconnection control in a microprocessor-based multiport communications adapter. The system transfers data using either DMA or interrupt methods. The DMA/interrupt controller and arbiter governs data transfers among a plurality of ports.

U.S. Pat. No. 4,495,567 shows control of access by several data processors to each of several memories, each processor having a local memory to which access is controlled by a bus controller.

An example of a commercially available direct memory access controller is a Motorola MC6844 device. It can control four separate channels independently from one another and each of the channel controllers is separately programmable.

The transfer of data from a first bus to a memory and then from the memory to a second bus requires two transfer operations. The transfer of data from one external bus to another can be performed in one transfer cycle by coupling the external buses with a separate DMA device. This increases the complexity of the system and the contention problems associated with the DMA devices competing for control of the buses.

The present invention allows transfers from one external bus to the other without utilizing the memory on the local bus and without the addition of another DMA device. The DMA devices transfer data from one DMA device to the other via the connection to the local bus.

In accordance with the invention, first, second, and third buses for carrying data signals are coupled by first and second direct memory access devices so that one of the latter is coupled between the first and the second buses and the other is coupled between the second and the third buses. The direct memory access devices are coupled together to transfer data between them over the second bus so that data can be transferred between said first and third bus means via said second bus means.

BRIEF DESCRIPTION OF THE DRAWING

The invention is described in detail by referring to the various figures which illustrate specific embodiments of the invention, and wherein like numerals refer to like elements.

DESCRIPTION OF THE PREFERRED EMBODIMENT

In the following description, the buses are described in terms of external and local buses. A local bus is a common bus relative to each DMA device. Although the invention is described in terms of coupling two external buses via a local or common bus, the concept can be extended to coupling two buses via more than one intermediate bus.

Figure 1:
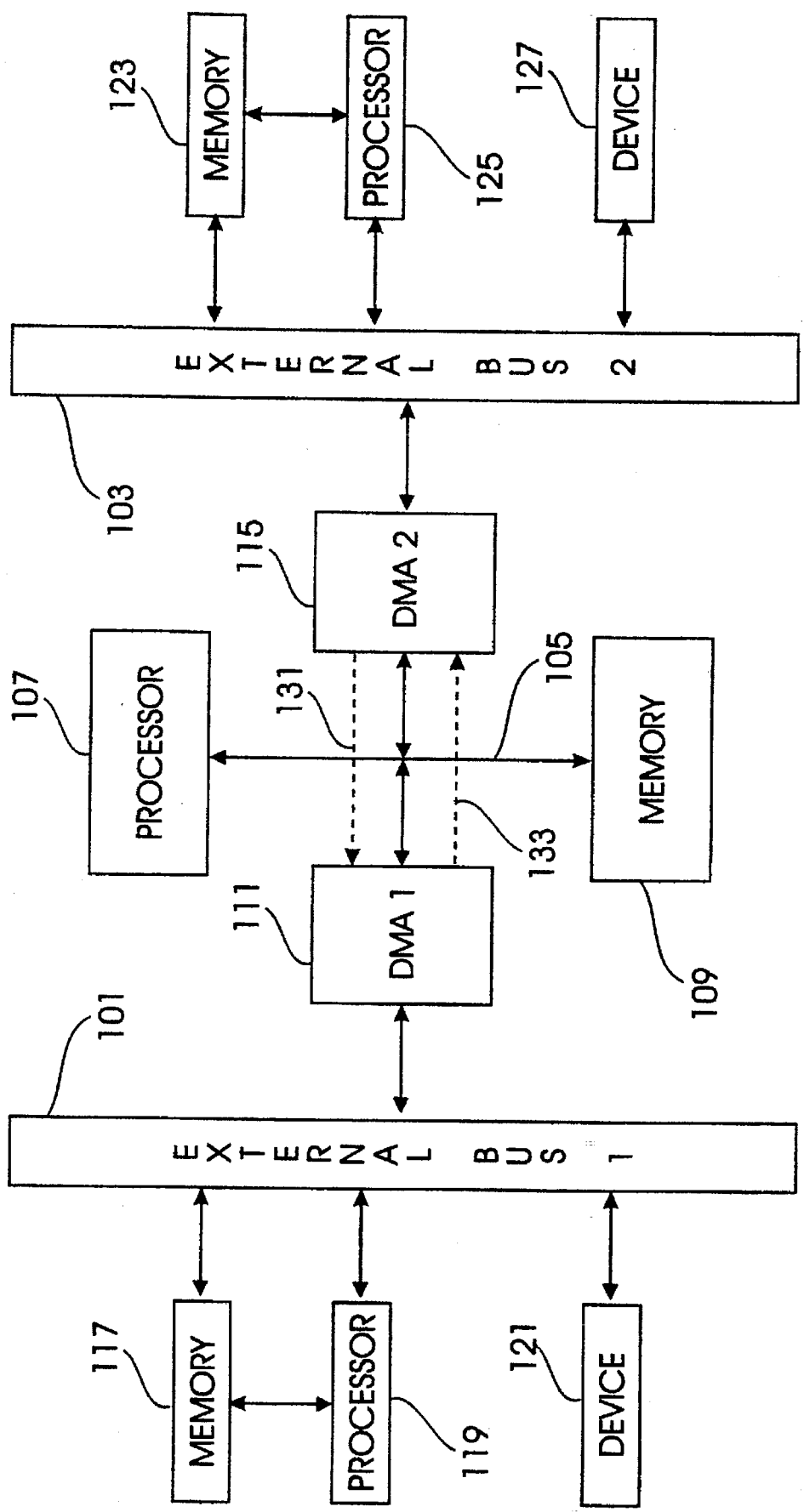
FIG. 1 is a block diagram of a typical system having two external buses and a local bus.

In FIG. 1, a system is shown having a processor 107 and a memory 109 coupled together over a local bus 105. A first DMA device, DMA 1 111, couples a first external bus, external bus 1 101, to the local bus 105. A second DMA device, DMA 2 115, couples a second external bus, external bus 2 103, to the local bus 105.

On external bus 1 101, there is a processor 119 and its associated memory 117 coupled by a local bus and some data device 121. Similarly, on external bus 2 103, there is a processor 125 and its associated memory 123 coupled by a local bus and some data device 127.

The DMA devices 111 and 115 are coupled by control lines 131 and 133 to be described in detail below.

The normal operation of the DMA devices couples an external device, e.g., the data device 121 on external bus 1 101, to the memory 109 to transfer data from the device 121 to the memory 109 or from the memory 109 to the device 121. If data is to be transferred from a data device on external bus 1 to a data device on external bus 2 103, the data is transferred from external bus 1 101 via the DMA device 111 to the local bus 105 into the memory 109. Then the DMA device 115 transfers the data from the memory 109 to the external bus 2 103.

DMA devices are designed to act as bus masters on the buses to which they are coupled. That is, when moving data from one bus to another, the DMA device is a bus master on the source bus and also on the destination bus. The invention is directed to modifying the DMA devices so that, when functioning to effect a triple bus transfer, one of the DMA devices can be configured as a bus slave device on the local or common bus.

Figure 2:
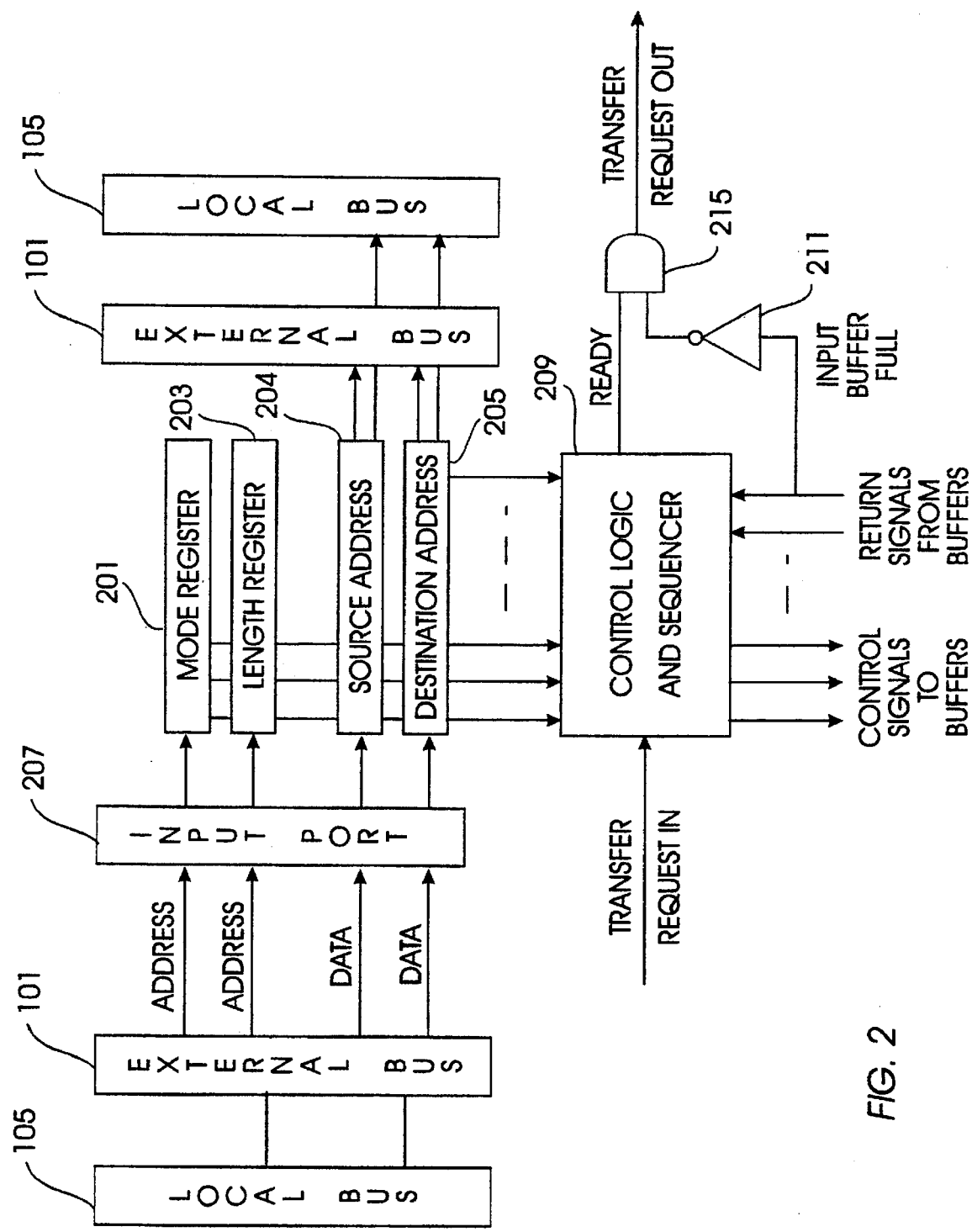
FIG. 2 is a block diagram of one controller in a programmable DMA device.

FIG. 2 shows the control portion of a DMA device. The DMA device is a programmable, buffered, bus-to-bus DMA device. An external bus 101 and a local bus 105 are shown as both input sources and output destinations. On the input side of the DMA device, an input port 207 decodes the address signals from the bus and gates the signals on the data portion of the bus into the control registers. Each DMA device has a unique address and devices on the buses, including the local bus 105, program the appropriate DMA device by writing the DMA device's unique address onto the bus and the programming data onto the bus.

Typically, a DMA device may contain a mode register 201 which holds the operation to be performed, e.g., read or write. It will also hold information related to the size of the word on the bus. Buses may be 32 bits wide but some devices may handle only 8 bits (bytes) or 16 bits at a time. The mode register 201 is modified for the invention to indicate whether the DMA device is to operate as bus slave.

Another control register in a DMA device is a length register 203. This is loaded with information related to the length of the data transferred. Typically, this can be a count of the number of data words to be transferred, a word being the contents on the data portion of the buses during any given cycle whether 8 bits, 16 bits, or 32 bits wide.

A source address register 204 is set to the address of the device that is to supply the data for transfer and a destination address register 205 is set to the address of the device that is to receive the data.

When the control registers 201–205 have been set, the DMA device loads its buffers under the control of its control logic and sequencer 209.

Figure 3:
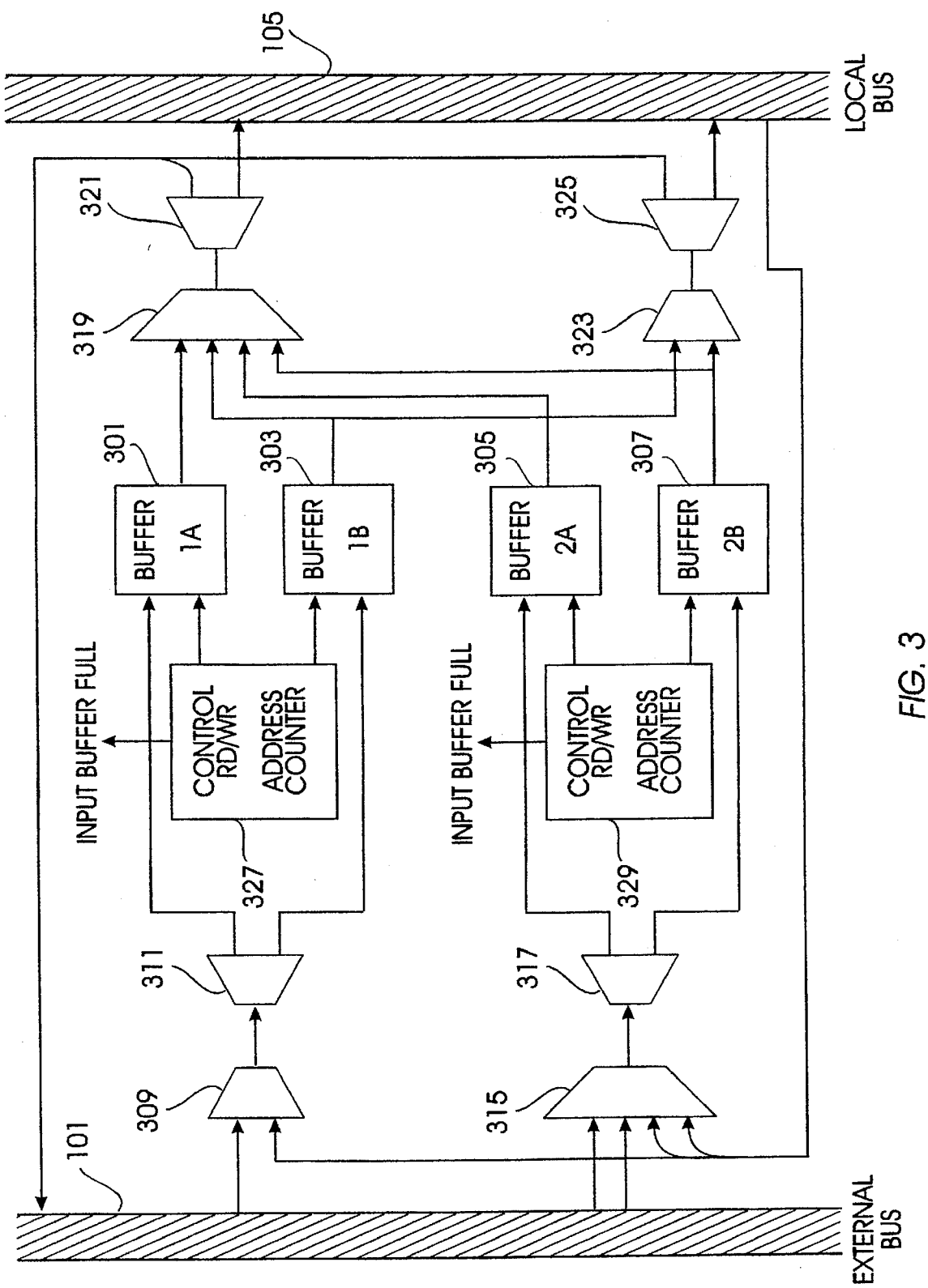
FIG. 3 is a block diagram of the buffers in a DMA device.

A useful buffer arrangement is shown in FIG. 3. The signals from an external bus 101 are coupled to two multiplexors 309 and 315. The full bus is shown coupled to the multiplexor 309. The bus signals are split between two input terminals of the multiplexor 315. This provides flexibility in storing and routing data. The multiplexors 309 and 315 determine which bus is the input bus.

The output signals from the multiplexors are each coupled to a 1:2 distributor (demultiplexor) 311 and 317. The distributors 311 and 317 direct the incoming data to one of two buffers. The buffers are designed for two separate data transfer operations. (There are two controllers as shown in FIG. 2, one for each pair of buffers.) One pair of buffers 301 and 303 operate under one controller and the other pair of buffers 305 and 307 operate under another controller. This prevents tying up a bus if data transfers are being made to a slow device. When the buffers are loaded by a fast input device and written to a slow device, or vice versa, the DMA device must wait for the slow device. Using a double pair of buffers with separate controllers permits the other controller to function between other devices while the first is waiting.

The buffers are shown as pairs so that one buffer in the pair can be written to while the other of the pair is being read from. This arrangement is referred to as ping-ponging. Other buffer arrangements can be used, e.g., ring buffers or FIFO (first-in-first-out) buffers. The distributors 311 and 317 route the data to the buffer being loaded, i.e., the input buffer.

Each pair of buffers has a control 327 and 329. The controls supply the read or write signals as appropriate and under the control of a controller as shown in FIG. 1. The controls also contain address counters that supply the operative addresses of the buffers.

The output signals from the buffers are coupled to multiplexors 319 and 323. The buffers' output signals can be coupled in any desired arrangement, the illustration being particularly useful for split buses or bus sizing.

The output signals from the multiplexors are each coupled to a 1:2 distributor 321 and 325 which determines to which bus the output signals are to be transferred.

The controls 327 and 329, the multiplexors 309, 315, 319, and 323, as well as the distributors 311, 317, 321, and 325 are controlled by the appropriate controller, one of which is shown in FIG. 2.

Figure 4:
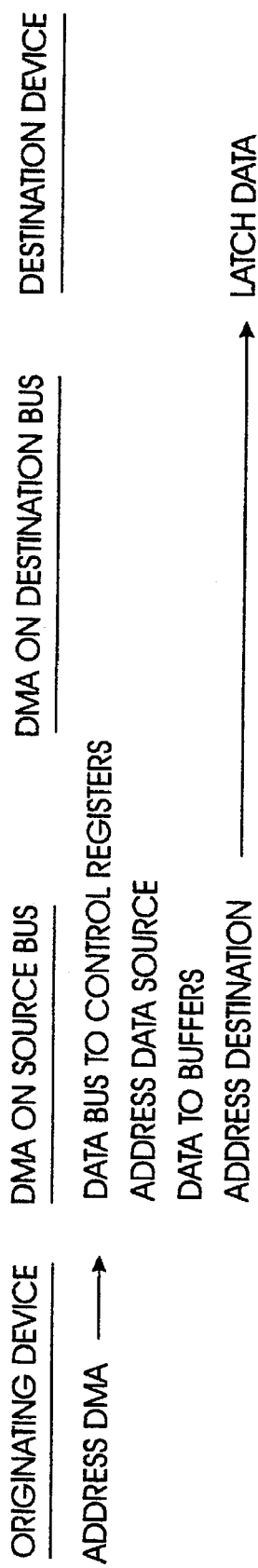
FIG. 4 is an information flow diagram showing the normal bus-to-bus operation of a DMA device.

The information flow for a normal DMA bus-to-bus operation is shown in FIG. 4. In the following description, addressing a device means placing the address of the device onto the appropriate bus. If the operation is a write operation, the write data is placed on the bus. If a read operation, the addressed device places the data on the bus. This is encompassed by the term "addressing" for purposes of explanation.

The originating device puts the address of the appropriate DMA device on the bus together with the control register setup information. The addressed DMA device gates the data signals from the bus into the control registers. (This may take more than one cycle.) When the control registers are loaded, the DMA device addresses the source to read the data to be transferred. (The data source device is not necessarily the originating device.) The DMA device acts as a bus master on the source bus. The addressed data is moved into the DMA device buffers. The DMA device then addresses the destination device on the appropriate bus together with the data. The addressed destination device latches the data from the bus. The DMA device acts as a bus master on the destination bus. The operation continues until the amount of data as specified by the setting of the length register has been transferred.

More details of the operation of bus masters and bus slaves is shown and described in the patent applications Ser. No. 07/473,014 and 07/590,718, incorporated herein by reference.

Figure 5:
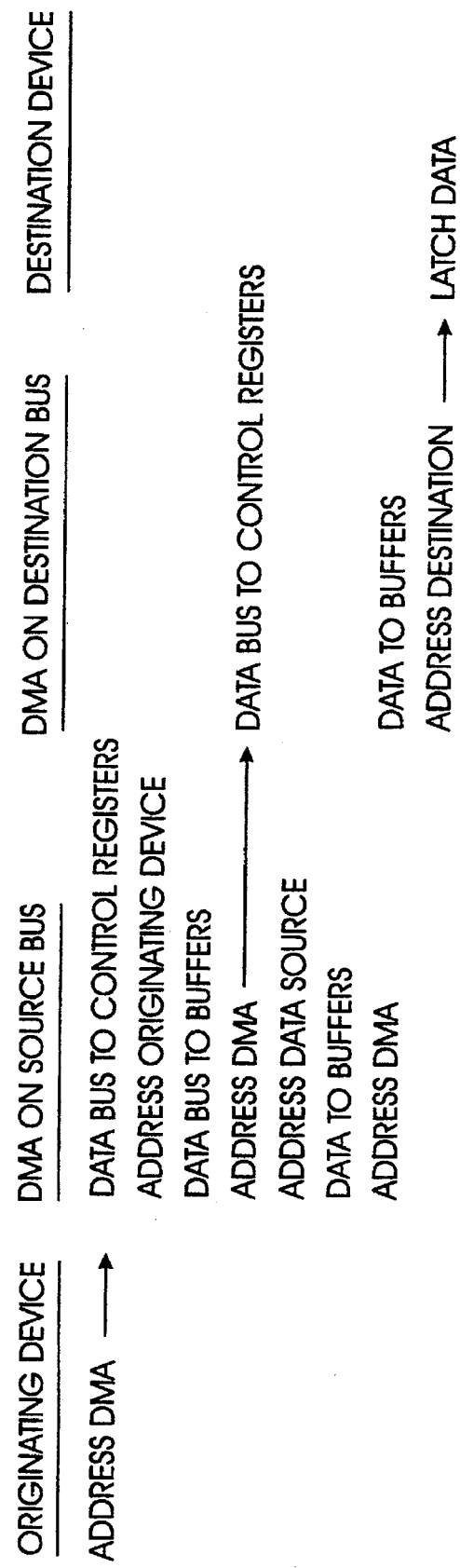
FIG. 5 is an information flow diagram showing a triple bus transfer operation according to the invention.

The information flow according to the invention is shown in FIG. 5. The originating device addresses the appropriate DMA device and the information on the data portion of the bus is gated into the control registers. This time the DMA device addresses the originating device and gates the data from the bus into the buffer registers. The DMA device then addresses the DMA device on the common bus and the data from the buffers is moved into the control registers of the second DMA device. The first DMA device acts as a bus master and the second, as a bus slave. The roles are reversed when the source device is on the other external bus.

The first DMA device then addresses the source device and gates the data into its buffers. It then addresses the second DMA device which gates the data into its buffer. The second DMA device addresses the destination device which latches the data.

To accomplish the above sequence, the DMA devices are modified. The buffer controls of FIG. 3 supply a signal that the input buffer is full to their associated controller as shown in FIG. 2. The input buffer is the buffer receiving the data. When all the data from the other buffer has been written, and the first is full, then the other buffer becomes the input buffer. A normal DMA device controller holds off when the signal is received and resumes reading data when the buffers can be used.

Since the second DMA device is operating as a bus slave, it has no control over the data it is receiving. Therefore, the DMA devices are modified to supply a signal to the DMA device acting as the bus master on the local bus that its input buffer is full. This is shown in FIG. 2 as a transfer request signal. A ready signal from the slave DMA device indicates that the slave DMA device is prepared to receive data. Initially, the buffers of the bus slave are empty so the input buffer full signal is inactive. An inverter 211 inverts the signal to prime an AND gate 215 that supplies the transfer request signal.

The bus master DMA device receives the bus slave DMA device's transfer request signal as a transfer request signal which, when active, does not affect the control logic and sequencer 209. When it is inactive, however, it causes a holdoff in the control logic and sequencer 209 to inhibit more data from being transmitted to the bus slave DMA device. One manner of holding off the control logic and sequencer 209 can be to inhibit any change of state in the state machine of the control logic and sequencer 209. (See, for example, the patent applications incorporated by reference.)

When the input buffer is full, the signal to the control logic and sequencer 209 is active and, via the inverter 211, inhibits the AND gate 215 to drop the transfer request signal to the bus master DMA device.

This arrangement limits the transfer bandwidth to that of the local bus. In the prior art method of transfer from one external bus to another, the bandwidth of the local bus had to be twice that of the external buses.

When the bus slave DMA device is operating to the external bus, it acts as a bus master in the normal way. If the destination device is slower than the source device, then the first DMA is free to perform other operations while waiting for the transfer request signal from the bus slave DMA device. The other operations are performed using the other controller and buffers of the DMA device.

The second controller and buffers can be a separate DMA device with holdoff signals and arbitration logic for controlling the associated buses.

While the invention has been particularly shown and described with reference to a preferred embodiment thereof, it will be understood by those skilled in the art that various changes and modifications in form and details may be made therein without departing from the spirit and scope of the invention according to the following claims.

What is claimed is:

1. The combination comprising:
   central processor means;
   central memory means for storing data used by said central processing means;
   first, second, and third bus means for carrying data signals, the second bus means coupling said central memory means with said central processing means;
   first and second direct memory access device means, one of which is coupled between the first and the second bus means and the other is coupled between the second and the third bus means; and
   means coupling said direct memory access device means together for controlling transfer data therebetween via said second bus means.

2. The combination claimed in claim 1 wherein said coupling means includes transfer request signal means for controlling the transfer of data between said first and second direct memory access device means.

3. The combination claimed in claim 2 wherein said transfer request signal means includes means coupled to said direct memory access device means for determining that a receiving direct memory access device means cannot accept additional data.

4. The combination comprising:
   memory means for storing data;
   common bus means for operatively coupling said memory means to a memory utilization means;
   first and second external bus means, each for coupling together data device means;

first and second memory accessing means coupled between said common bus means and said first and second external bus means, respectively, for transferring data between said data device means coupled to the first and second external bus means and said memory means, each of said memory accessing means including buffer means for storing data from a bus, addressing means for supplying address signals signifying to an addressed memory access means that data is available for transfer, transfer request means for supplying a signal to said addressed memory access means signal signifying that data is to be transferred, and means responsive to the buffer means of said addressed memory access means being filled to deactivate the signal from transfer request means; and means responsive to said signals for controlling transfer of data between said first and second memory accessing means, whereby data is transferred between data device means on the first and second external buses over said common bus means.

5. The combination claimed in claim 4 wherein said memory utilization means includes processor means and said data device means includes processor means.

6. The combination claimed in claim 4 wherein said buffer means is a pipelined plurality of registers for storing a plurality of data words.

* * * * *